(12) United States Patent
Lehmann (10) Patent No.: US 11,595,001 B2
(45) Date of Patent: Feb. 28, 2023

(54) COOLING ELEMENT FOR UPGRADING A PHOTOVOLTAIC MODULE AND METHOD FOR UPGRADING THE SAME

(71) Applicant: ATS ADVANCED THERMO SOLUTIONS AG, Zurich (CH)

(72) Inventor: Markus Lehmann, Wohlen (CH)

(73) Assignee: ATS ADVANCED THERMO SOLUTIONS AG, Zurich (CH)

(*) Notice: Subject to any disclaimer, the term of this patent is extended or adjusted under 35 U.S.C. 154(b) by 526 days.

(21) Appl. No.: 15/738,795

(22) PCT Filed: Jun. 29, 2016

(86) PCT No.: PCT/EP2016/065156
§ 371 (c)(1),
(2) Date: Dec. 21, 2017

(87) PCT Pub. No.: WO2017/001485
PCT Pub. Date: Jan. 5, 2017

(65) Prior Publication Data
US 2018/0191296 A1    Jul. 5, 2018

(30) Foreign Application Priority Data
Jun. 30, 2015    (CH) .................................. 00945/15

(51) Int. Cl.
*H02S 40/42*    (2014.01)
*H02S 40/44*    (2014.01)
(Continued)

(52) U.S. Cl.
CPC ............ *H02S 40/425* (2014.12); *H02S 20/10* (2014.12); *H02S 40/44* (2014.12); *H02S 20/23* (2014.12); *H02S 30/10* (2014.12); *Y02E 10/60* (2013.01)

(58) Field of Classification Search
CPC ............................... H02S 40/425; H02S 40/44
See application file for complete search history.

(56) References Cited

U.S. PATENT DOCUMENTS

| 4,392,008 A * | 7/1983 | Cullis | ................ | H01L 31/0521 |
| | | | | 136/248 |
| 2005/0161074 A1 * | 7/2005 | Garvison | ............ | H01L 31/0521 |
| | | | | 136/246 |

(Continued)

FOREIGN PATENT DOCUMENTS

| DE | 202011004424 | 6/2012 |
| DE | 202011109473 | 3/2013 |

(Continued)

OTHER PUBLICATIONS

International Preliminary Report on Patentability with English translation (PCT/EP2016/065156) dated Jan. 31, 2018.

(Continued)

*Primary Examiner* — Sadie White
(74) *Attorney, Agent, or Firm* — Paul D. Bianco; Fleit Intellectual Property Law (57) ABSTRACT

The invention relates to cooling element (5) having a fastening device (16) for upgrading any standard, commercially available photovoltaic module (1) for increasing the efficiency of the photovoltaic module (1). According to the invention, it comprises a heat insulation mat (6) having an upper surface (7), in which pipe channels (8) aligned parallel with each other are created, wherein the borders of the pipe channels (8) and the upper surface (7) of the heat insulation mat (6) are constructed with heat conduction plates (9), preferably aluminium plates. It further comprises a pipe (10) that is routed in loops (11) in all of the pipe channels (8) constructed with the heat conduction plates (9). The inven- (Continued)

tion also relates to a method for attaching a cooling element (5) according to the invention to a photovoltaic module (1).

14 Claims, 3 Drawing Sheets

(51) Int. Cl.
  *H02S 20/10* (2014.01)
  *H02S 20/23* (2014.01)
  *H02S 30/10* (2014.01)

(56) References Cited

U.S. PATENT DOCUMENTS

| | | | | |
|---|---|---|---|---|
| 2007/0215198 | A1* | 9/2007 | Jiang | H01L 31/052 136/246 |
| 2008/0011289 | A1* | 1/2008 | Sichanugrist | H02S 40/44 126/634 |
| 2008/0083176 | A1* | 4/2008 | Barsun | F24S 10/755 52/173.3 |
| 2008/0245403 | A1* | 10/2008 | Stimson | F24S 20/67 136/248 |
| 2008/0302405 | A1* | 12/2008 | Intrieri | H02S 40/44 136/246 |
| 2009/0065046 | A1* | 3/2009 | DeNault | H02S 40/44 136/248 |
| 2009/0223511 | A1* | 9/2009 | Cox | F24D 19/1006 126/714 |
| 2009/0288705 | A1* | 11/2009 | Hiwatashi | H01G 9/20 136/256 |
| 2010/0154864 | A1* | 6/2010 | Oh | H01L 31/0547 136/248 |
| 2010/0288334 | A1* | 11/2010 | Chu | F24S 80/56 136/248 |
| 2011/0108089 | A1* | 5/2011 | du Boise | F24S 10/755 136/246 |
| 2011/0114155 | A1* | 5/2011 | Stoev | F24S 10/755 136/246 |
| 2011/0186109 | A1* | 8/2011 | Elazari | H02S 40/44 136/248 |
| 2012/0175082 | A1* | 7/2012 | Kmetovicz | F24S 10/95 165/104.21 |
| 2013/0269755 | A1* | 10/2013 | Xu | F24S 10/75 136/248 |
| 2014/0102556 | A1* | 4/2014 | Malpas | H02S 20/23 137/360 |
| 2014/0260000 | A1* | 9/2014 | Haynes | H02S 20/23 52/302.1 |
| 2015/0090432 | A1* | 4/2015 | Feron | H02S 40/44 156/60 |

FOREIGN PATENT DOCUMENTS

| | | |
|---|---|---|
| DE | 202013102508 | 6/2013 |
| DE | 102012017382 | 3/2014 |
| EP | 1191606 | 3/2002 |
| EP | 2352179 | 8/2011 |
| NL | 2010917 | 12/2014 |

OTHER PUBLICATIONS

International Search Report (PCT/EP2016/065156) dated Aug. 31, 2016.

* cited by examiner

COOLING ELEMENT FOR UPGRADING A PHOTOVOLTAIC MODULE AND METHOD FOR UPGRADING THE SAME

CROSS-REFERENCE TO RELATED APPLICATIONS

This application claims priority to International Application Ser. No. PCT/EP2016/065156, filed Jun. 29, 2016, which claims priority to Swiss Application No. 0094/15, filed Jun. 30, 2015. International Application Serial No. PCT/EP2016/065156 is hereby incorporated herein in its entirety for all purposes by this reference.

FIELD OF THE INVENTION

The invention relates to a cooling element with a fastening device for upgrading any standard, commercially available photovoltaic module with an underside and equipped with a connecting device, for the purpose of increasing the efficiency of the photovoltaic module. The invention also relates to a method for upgrading such a photovoltaic module.

BACKGROUND

When electricity is generated by photovoltaic (PV) means, a large fraction of the solar radiation that reaches the module is converted into heat. Heating of the module reduces its efficiency noticeably. Measurements have shown a performance loss of about 0.5% per degree of heating, with the result that estimates assume a loss of 10-30%. The combined use of electricity and heat in a hybrid module is not yet very widespread. Hybrid modules that are available are pre-installed on a given module or have a fixed absorber mass. The solutions offered are also very expensive.

A device for cooling photovoltaic systems that are arranged in stowage spaces underneath the photovoltaic modules by absorbing and draining the heat generated on the surface and supplying it to a place of use is known from DE 102012017382 A1, Such devices are always disposed at a distance from the photovoltaic module, and thus absorb the heat by convection and radiation. The disadvantage of such devices is that a relatively complicated frame system with crossmembers and U- or L-shaped mountings must be provided on the roof, into which the devices can be inserted. The heat pickup through convection and radiation is also relatively low.

EP 1191606 A2 describes a solar roof panel element in which the underside is furnished with pipes, wherein the pipes are surrounded by an insulating material. This element is prefabricated at the factory and is therefore bonded to a specific solar laminate which is manufactured using thin film technology.

EP 2352197 A2 also describes a photovoltaic module having a plurality of pipes embedded in the substructure thereof, of which some may carry water, and others may carry air. These modules are called "solar roof tiles" and include connecting devices which can be attached to each other.

All devices are unsuitable for upgrading any previously installed or newly chosen photovoltaic modules without altering the installation construction of the photovoltaic modules.

A solar module with a plurality of thin cooling pipes incorporated in the back thereof is known from DE 202011109473 U1. This piping arrangement is covered with metal foils on both sides and further covered on the back first with a flexible equalisation mat and secondly with a thermal insulation material. A firm construction applies pressure evenly over the full area of the assembly to press it against the photovoltaic module from the rear. Since the second metal foil—facing away from the photovoltaic module—must surround the cooling pipes, it is exposed to substantial stresses from the equalisation mat during pressing. Since this foil is also thinner than the other foil, which lies flush against the photovoltaic module, there is a danger that the foil may tear and in turn that the heat dissipation may be interrupted. This solar module is also prefabricated by the manufacturer with all of the thin cooling pipes already embedded therein. Connectors on the underside of the solar module ensure that the cooling medium can flow into and out of the cooling pipes.

The purchaser is able to choose from a wide range of photovoltaic modules to meet his wishes and needs. Apart from their technical modes of operation and efficiencies, these also differ in terms of availability in a given region, size, country of origin, external design, price structures and so on. In a very small number of cases, a use for heating is also offered in combination with the photovoltaic modules. Moreover, many home owners already have a photovoltaic system, which they would like to upgrade to improve its efficiency and to be able to use the recovered heat for their own heating needs. A commercial solution for this is does not exist.

BRIEF SUMMARY OF THE INVENTION

The object of the present invention is to describe a cooling element with a fastening device for upgrading any standard, commercially available photovoltaic module that can be manufactured inexpensively in predetermined dimensions. A method for upgrading such a photovoltaic module should also be described.

This object is solved as described below.

The cooling element according to the invention comprises a heat insulation mat with an upper surface in which pipe channels are created to run parallel to each other. The borders of the pipe channels and the upper surface of the heat insulation mat are constructed with one or more heat conduction plates, which are preferably aluminium plates. The cooling element according to the invention further comprises a pipe which is routed in loops in all of the pipe channels constructed with the heat conduction plates in such manner that the largest part of the pipe is located inside the heat insulation mat. The contour of the heat insulation mat with the pipe routed inside it is also of such a design that when the one or more heat conduction plates of the cooling element is/are facing the underside of the photovoltaic module, the cooling element fits completely below the selected photovoltaic module. If the connecting device is attached to the underside of the photovoltaic module, a cutaway in the cooling element is preferably provided in the region of the connecting device. The cooling element may be fastened to the photovoltaic module with the aid of the fastening device.

Such a cooling element may be manufactured very inexpensively, because housing technology wholesale suppliers already deliver all of the components needed therefor in the requisite form, for example components for underfloor heating systems. Finally, in order to manufacture the cooling elements it is necessary to know the dimensions of the respective photovoltaic modules that are to be upgraded. This also includes knowing the precise position of the connecting device, which is attached to the underside in most photovoltaic module models.

Most photovoltaic modules are also mounted in a frame, which may finally be installed in the desired location, on a roof, for example. In this case, it is normally possible to use the available space within the frame. In the case of models without a frame, a similar structure may be attached additionally according to the installation suggestions provided by the manufacturers of the photovoltaic modules.

The cooling element is fastened to the photovoltaic module preferably by adhesion or clamping. The cooling element is attached to the photovoltaic module without a gap before being fastened in its final location of use on a roof or other structure together with the photovoltaic module. This ensures good contact with the photovoltaic module and consequently good heat conductivity as well.

In the method according to the invention, an inventive cooling element is positioned accordingly with the side of its one or more heat conducting plates(s) facing the underside of the photovoltaic module to be upgraded, so that it may be completely covered thereby, although a cutaway is provided in the region of the connecting device. Then, the cooling element is placed against the underside of the photovoltaic module in this position, and the cooling element is fastened to the photovoltaic module with the fastening device. This fastening is preferably assured by adhesion or clamping. The essential point is that the cooling element can be placed flat and without gaps on the photovoltaic module. This will ensure good thermal conductivity.

Afterwards, the various pipes or all the cooling elements are connected to each other, and feed and drain lines are added to complete the circuit, in which a heat exchanger is also integrated. This ensures that a cooling fluid circulating in the circuit is cooled again so that it can again absorb heat from the photovoltaic modules. The heat recovered in this way may also be used to produce hot water, for example or to heat the water in a swimming pool.

Further preferred devices and methods are describe below.

BRIEF DESCRIPTION OF THE DRAWINGS

In the following text, the invention will be explained in greater detail with reference to the drawings. In the drawings.

DESCRIPTION OF EXEMPLARY EMBODIMENTS OF THE INVENTION

Figure 1:
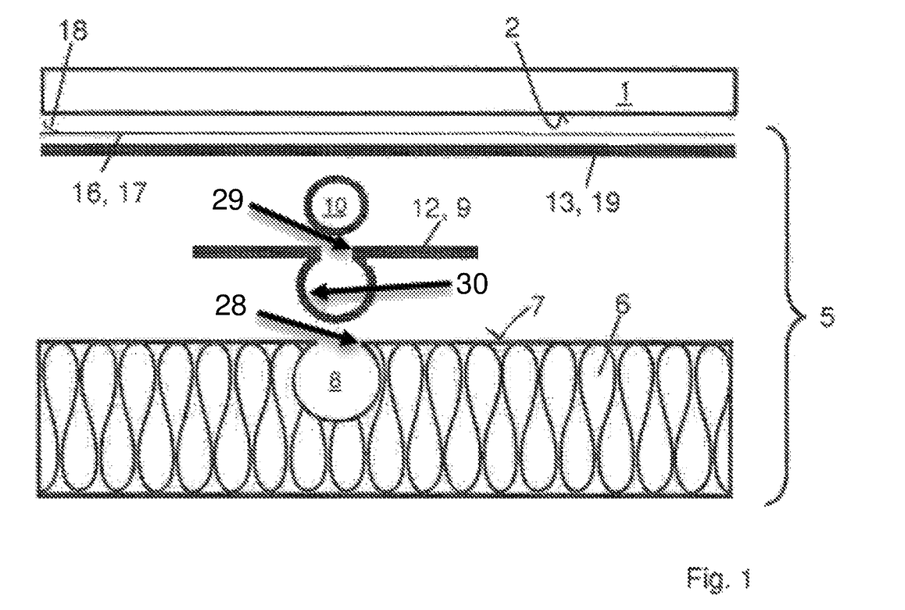
FIG. 1 is an exploded cross-sectional view of a part of a cooling element according to the invention with a photovoltaic module.
Figure 3:
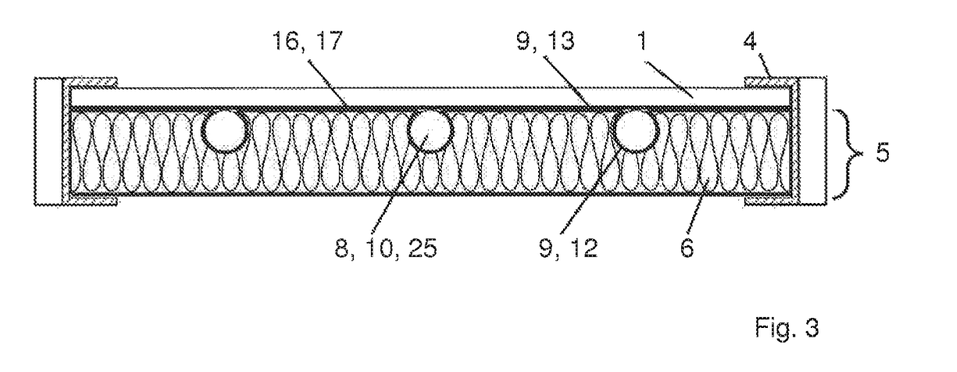
FIG. 3 is a schematic cross sectional view of a cooling element according to the invention mounted on a photovoltaic module.
Figure 5:
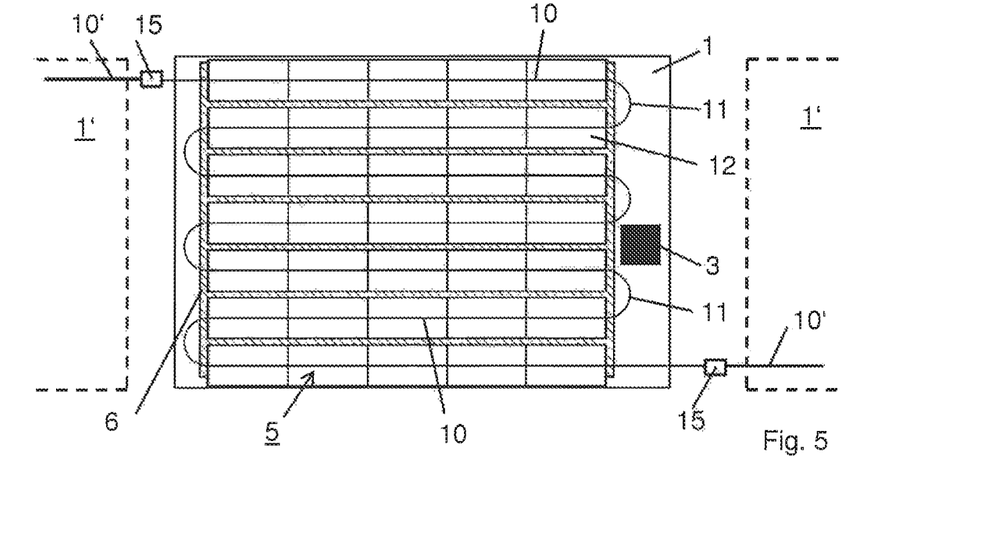
FIG. 5 is a schematic representation of the interaction of a cooling element according to the invention arranged on the underside of a photovoltaic module.
Figure 6:
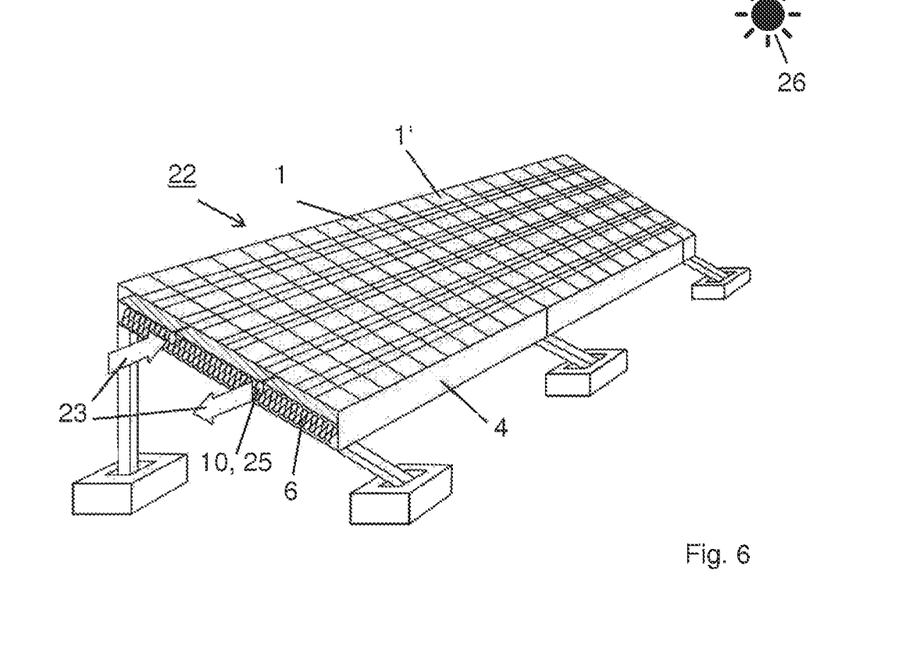
FIG. 6 is a schematic, perspective representation of a cooling element according to the invention mounted below a fully installed photovoltaic module.

FIG. 1 is an exploded view of in cross section of a part of a cooling element 5 according to the invention with a photovoltaic module 1. Any standard, commercially available photovoltaic module 1 can be upgraded by assembling it with a cooling module 5 according to the invention using a fastening device 16. Photovoltaic module 1 has an underside 2 to which a connecting device 3 for electrical installation is typically attached, as shown in FIG. 5, Alternatively, this connecting device 3 may also be in the form of an electronic module, with wires which are not attached to the underside 2 but are disposed on the side of photovoltaic module 1. Underside 2 is disposed opposite an upper side, which is exposed to sunlight during use, so that photovoltaic module 1 can generate electricity, Photovoltaic module 1 is usually fitted in a frame 4, as shown in FIG. 3, which frame 4 is significantly higher than the height of photovoltaic module 1. Frame 4 is used for fastening to a subsurface, a roof or rack, for example, as shown in FIG. 6. Frame 4 also provides room for electrical connecting device 3 if such a device is arranged on underside 2 of photovoltaic module 1, as shown in FIG. 5.

With such an arrangement, the efficiency of photovoltaic module 1 can be increased by cooling it. Efficiency diminishes as temperatures rise, with the result that in high summer, particularly in hot regions, the output of a photovoltaic module 1 can be very significantly impaired. Moreover, heat that is picked up can also be used in cooling module 5. In winter, cooling module 5 may be used as a heating module, to support the task of melting snow on photovoltaic module 1, so that the benefit of photovoltaic module 1 may be enhanced further still.

Cooling modules 5 according to the invention are of simple construction and can be produced in dimensions fitting or required by the respective photovoltaic modules 1, in particular at the installation site as well. They are fastened to the photovoltaic modules 1 with the aid of fastening device 16, and the photovoltaic modules 1 may then be installed in the position desired for future operation. In doing so, it is most important to ensure good, direct contact between photovoltaic module 1 and cooling module 5.

Figure 2:
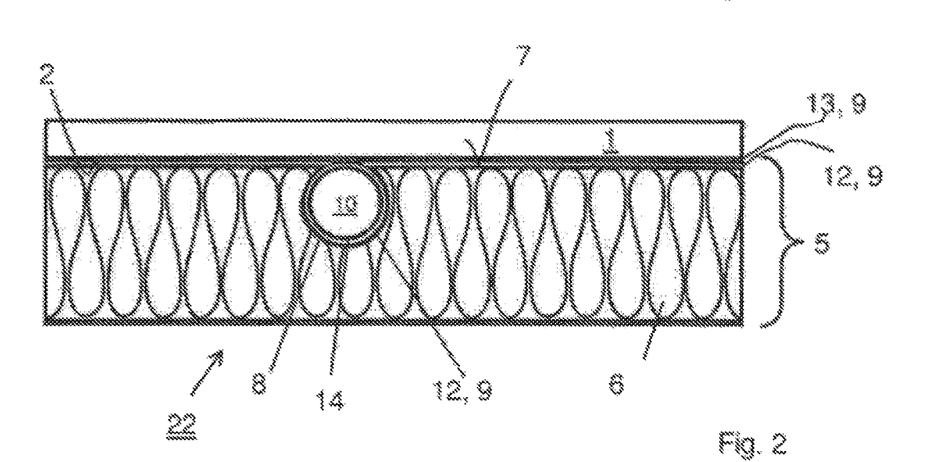
FIG. 2 shows the view of FIG. 1 in assembled form.

As is shown in FIGS. 1-3, cooling module 5 comprises a heat insulation mat 6 with an upper surface 7, which faces towards photovoltaic module 1 when the cooling module 5 is mounted thereon. Pipe channels 8 are incorporated in the interior beneath this surface 7 in parallel alignment with each other and accessible by respective gaps 28 defined in the surface 7. The borders of pipe channels 8 and the upper surface 7 of heat insulation mat 6 are constructed with one or more heat conduction plates 9, preferably aluminium plates, which define respective slots 29 providing access into respective cavities 30 within the portion of the heat conduction plates 9 that are profiled to mirror the shapes of the pipe channels 8. Pipe channels 8 define partially cylindrical shapes and also surround a pipe 10, which is disposed inside the cavities 30 of the heat conduction plates 9, and routed in loops 11 in such a way that pipe 10 passes through all of the pipe channels 8 that are constructed with heat conduction plates 9, and the largest area of pipe 10 is inside heat insulation mat 6. The bends of loops 11 may be outside of the heat insulation mats 6, but should be kept as small as possible, because they cannot absorb the heat from photovoltaic module 1 as well. On the other hand, additional heat insulation mats 6 with looped pipe channels 8 clad with corresponding heat conduction plates 9 in which the bends of the loops 11 extend may also be used on the sides.

A schematic representation of this is shown in FIG. 5. The outline of the heat insulation mat 6 with the pipe 10 enclosed there is designed in such manner that cooling module 5 fits completely under the chosen photovoltaic module 1 when its one or more heat conduction plates 9 are facing the underside 2 of photovoltaic module 1. If electrical connecting device 3 is attached to the underside 2 of photovoltaic module 1, a cutaway is provided in the area thereof, as also appears in FIG. 5. FIG. 5 does not show a true arrangement, because the heat conduction plates 9 are visible in this view, in this case represented by heat conducting plates 12. In reality, these would be concealed by a cover plate 13 and finally by the photovoltaic module 1. FIG. 5 serves only to illustrate the arrangement and relative sizes of the cooling module 5, photovoltaic module 1, connecting device 3 and the loops 11 of pipe 10 that form U-shaped elbows 11. Optionally, both pipe ends or only one end may be provided with a connection point 15. A further pipe 10' may be connected to a connection point 15. In addition, the pipe ends may optionally be arranged on the same side of cooling module 5, or on different sides thereof, as shown in FIG. 5.

Assembly of the cooling modules 5 is preferably undertaken directly on site, where the photovoltaic modules are delivered for installation or where they are disassembled from their sites for purposes of upgrading. In this way, it may be guaranteed that each of the connections 15 is in the correct position for fitting the pipe connections 10, 10' optimally. Alternatively, the cooling modules 5 may be delivered having already been preassembled at the factory, if the dimensions and arrangement of the photovoltaic modules are already known. In either case, the cooling modules 5 are attached to the photovoltaic modules at the site and the assembled parts are then installed together in their final locations.

Pipes 10 are preferably goods supplied in measured lengths and consist of flexible or bendable material, so that they can be bent at the desired places, in the same way as pipes used for underfloor heating, for example. These also have the advantage that they are very inexpensive and are already optimised for conducting heat, so that a coolant medium circulating therein provides good heat transfer to the enclosing surface.

Heat insulation mat 6 is preferably made from polystyrene, polyurethane or a comparable material. Heat conduction plates 9 preferably comprise a plurality of individual plates. In particular, they comprise profiled heat conduction plates 12, as shown in FIG. 1 and FIG. 5, which define the borders of pipe channels 8 and adjacent partial areas of heat insulation mat 6. These components are standardised, and therefore very inexpensive. They can be cut to the desired length very easily. Finally pipe 10 can be routed in these borders to pipe channels 8. In this preferred arrangement, heat conduction plates 9 also comprise a cover plate 13 having the dimensions of the upper surface 7 of heat insulation mat 6. This plate is placed over heat conduction plates 12 during the manufacture of cooling module 5, and covers pipe 10 which is routed in the pipe channels 8 constructed with the heat conduction plates 12 as well as the profiled heat conduction plates 12 and the heat insulation mat 6 arranged below them.

Heat insulation mat 6 with pipe channels 8, heat conduction plates 9, heat conduction plates 12 and/or pipe 10 may also be derived from underfloor heating equipment, since these standard commercial semi-finished products also satisfy the right technical and physical prerequisites for the present use, and are also very inexpensive since they two are standardised, mass produced items.

The configuration of a cooling module 5 according to the invention described here is easy to produce and can be manufactured rapidly with any desired dimensions. The individual components may be joined together by adhesion if necessary.

In order to facilitate the transfer of heat between adjacent heat conduction plated 9 and/or between heat conduction plates 9 and pipe 10, a heat conducting paste 14 may be provided at these points. This enables the heat to be conducted away more efficiently from the photovoltaic module 1 to the fluid 25 which subsequently circulates inside pipe 10 during operation. As shown in FIG. 5, pipe 10 therefore preferably comprises at least one connection point 15 for connecting pipe 10 to another pipe 10' of the same size and type, attached to an adjacent photovoltaic module 1', for example. As a rule, upgrading is carried out for all photovoltaic modules 1, 1' in a group, which are installed on a roof for example, with cooling modules 5 according to the invention, the pipes 10, 10' of which are all connected to each other so that a fluid 25 can circulate in them. Examples are described in FIGS. 6 and 7. Pipes 10, 10' are preferably copper pipes. However, it has been found that plastic pipes or plastic-metal composite pipes are much less expensive than copper pipes and also deliver good results.

Compared with devices that include multiple pipes, such as are known from the prior art, the inventive device has the advantage that it is easier to manufacture. Since a single pipe is used, inexpensive goods supplied in measured lengths may be obtained and routed in loops, with the final result that each module has exactly one inlet and one outlet for the coolant fluid. Cooling modules with multiple pipes must have a correspondingly large number of connections or internal branches. This prevents fast, inexpensive configuration to desired dimensions, because branches and the corresponding unions take time to make and are expensive, since Y-junctions or similar manifolds must be installed. Of course, each manifold and union must also be leak-proof.

Cooling module 5 may be fastened to photovoltaic module 1 with the aid of fastening device 16 as shown in FIG. 3. Fastening device 16 is preferably an adhesive layer 17 that is attached to the outer upper surface of the one or more heat conduction plates 9. This adhesive layer 17 is preferably covered with a removable protective foil 18 until just before assembly. For the fastening procedure, the protective foil 18 is removed from adhesive layer 17 and cooling module 5 is placed on or pressed against photovoltaic module 1.

Figure 4:
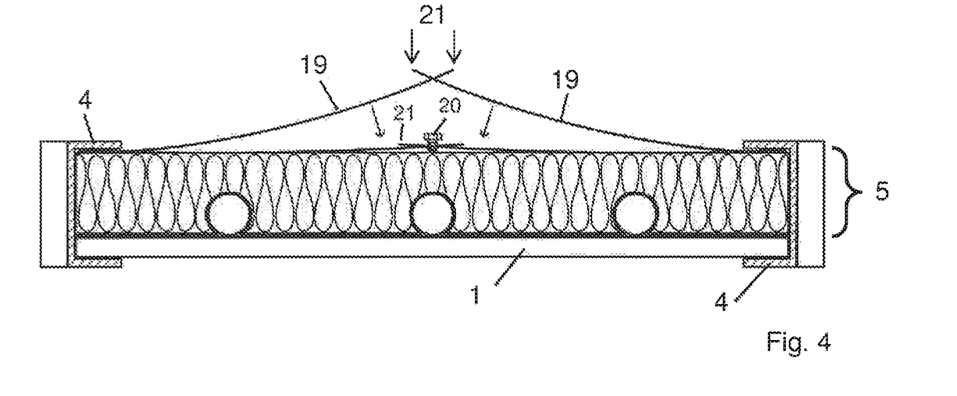
FIG. 4 is a schematic cross sectional view of a cooling element according to the invention mounted on a photovoltaic module with an alternative fastening device.

This fastening method may be implemented regardless of whether photovoltaic module 1 has a frame 4 or not. And the upgrade of a cooling module 5 on a standard, commercially available photovoltaic module 1 with a frame 4 can also be effected by means of a fastening device 16 comprising two convex plates 19 and one or more fastening means 20, as illustrated in FIG. 4. Examples of suitable fastening means 20 include for example rivets and screws, particularly pop rivets and metal screws. Cooling module 5 is clamped inside the frame to enable it to be fastened between plates 19 and the photovoltaic module 1. For this purpose, plates 19 are clamped to two opposing outer sections of frame 4 and overlap each other so that they can be held together with the one or more fastening means 20. In FIG. 5, the fastening operation is represented by the arrows. If an overlap larger than the one shown in FIG. 5 is created, two rows of fastening means 20 can also be attached, thereby improving stability.

The method according to the invention for upgrading any standard, commercially available photovoltaic module 1 with a cooling module 5 according to the invention is described with the following steps:

Cooling module 5 is turned so that one of more sides of the heat conduction plates 9 thereof faces the underside 2 of photovoltaic module 1, so that is can be completely covered thereby, wherein a cutaway is provided in the region of electrical connecting device 3; cooling module 5 positioned against the underside 2 of photovoltaic module 1 in this position; cooling module 5 is fastened to the photovoltaic module 1 with fastening device 16.

If fastening device 16 is an adhesive layer 17, the protective foil 18 is pulled off before cooling module 5 is placed against photovoltaic module 1. Accordingly, in the last step, cooling element 5 is bonded to and preferably pressed against the underside 2 of photovoltaic module 1 by its adhesive layer 17. The photovoltaic module is now an upgraded photovoltaic module 22. Afterwards, frame 4 may be attached and installation may proceed as for a photovoltaic module that has not been upgraded.

If photovoltaic module 1 comprises a frame and fastening device 16 has two convex plates 19 and one or more fastening means 20, in order to fasten cooling module 5 to photovoltaic module 1 each of the convex plates 19 is first clamped to one of the two opposing outer sections of frame 4, so that free edges 21 project away from cooling module 5, as shown in FIG. 4. Then, the free edges 21 of plates 13 are pressed towards cooling module 5 until they lie flush against it. To ensure that plates 13 remain in this position, they are fastened to each other with one or more fastening means 20, preferably screws or rivets, in an overlapping area. In this way, the photovoltaic module according to FIG. 4 is created.

Figure 7:
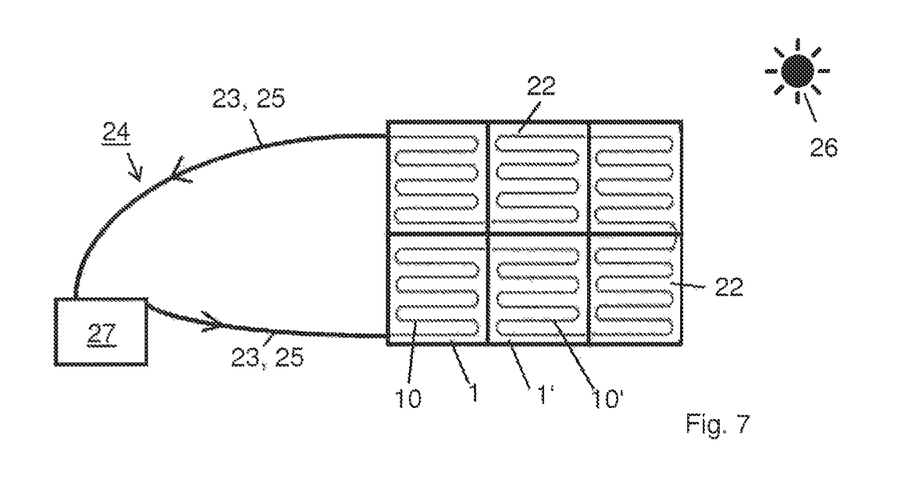
FIG. 7 is a schematic, representation of a cooling circuit.

Preferably, as shown in FIG. 6 and FIG. 7, multiple photovoltaic modules 1, 1' are upgraded with cooling elements 5 in the same way. After the upgrade has been completed, the upgraded photovoltaic modules 22 are moved into their required position and the pipes 10, 10' of the individual upgraded photovoltaic modules 22 are connected to each other and via feed and discharge pipes 23 to a circuit 24 that is filled with a fluid 25. In FIG. 6, the feed and discharge pipes 23 are represented schematically with arrows. Finally, the upgraded photovoltaic modules 22 may be exposed to the Sun 26. Fluid 25 circulates in circuit 24 and is consequently warmed in pipes 10, 10' by radiated sunlight. This heat is extracted from fluid 25 within circuit 24 in a heat exchanger 27 and is cooled so that it can absorb heat again in pipes 10, 10'.

FIG. 7 shows a schematic cooling circuit 24. Sun 26 warms the fluid 25 in the photovoltaic modules 22 which have been upgraded with cooling modules 5. This fluid circulates in the pipes 10, 10' and in the feed and discharge pipe 23, all of which are connected to form a circuit 24 and also include a heat exchanger 27.

The extracted warmth is preferably used for heating purposes, particularly to support a heat pump in a building, as a component of a low temperature system, for water treatment, to heat a swimming pool or as process heat in an industrial process.

REFERENCE LIST

1 Photovoltaic module; 1' adjacent photovoltaic module
2 Underside
3 Connecting device
4 Frame
5 Cooling element
6 Heat insulation mat
7 Upper surface
8 Pipe channel
9 Heat conduction plate
10 10' Pipe
11 Loop
12 Heat conduction plate
13 Cover plate
14 Heat conducting paste
15 Connection point for a pipe
16 Fastening device
17 Adhesive layer
18 Protective foil
19 Plate for fastening
20 Fastening means; screw, sheet metal screw, rivet, pop rivet
21 Free edge of a plate
22 Photovoltaic module upgraded with a cooling element
23 Feed and discharge pipe
24 Circuit
25 Fluid
26 Sun
27 Heat exchanger

The invention claimed is:

1. A cooling module for increasing the efficiency of any standard, commercially available photovoltaic module with an underside and an electrical connecting device, the cooling module comprising:
a heat insulation mat having an upper surface and an interior disposed beneath the upper surface, the heat insulation mat defining a first pipe channel within the interior and elongating in a first direction, the heat insulation mat defining a second pipe channel within the interior and elongating parallel to the first pipe channel and spaced apart from the first pipe channel in a direction normal to the first direction, each of the first pipe channel and the second pipe channel defining a partially cylindrical shape accessible through the upper surface of the heat insulation mat via a gap aligned with the respective pipe channel;
a first heat conduction plate contacting the upper surface of the heat insulation mat and contacting the first pipe channel within the heat insulation mat, the first heat conduction plate defining a portion that is configured to mirror the partially cylindrical shape of the first pipe channel, the first heat conduction plate defining a slot accessible from the upper surface of the heat insulation mat and aligned parallel with the gap that renders the first pipe channel accessible from the upper surface of the heat insulation mat;
a second heat conduction plate contacting the upper surface of the heat insulation mat and contacting the second pipe channel within the heat insulation mat, the second heat conduction plate defining a portion that is configured to mirror the partially cylindrical shape of the second pipe channel, the second heat conduction plate defining a slot accessible from the upper surface of the heat insulation mat and aligned parallel with the gap that renders the second pipe channel accessible from the upper surface of the heat insulation mat, wherein the first heat conduction plate and the second heat conduction plate are separate from each other and define a space therebetween; and
a pipe having a first section disposed in the portion defined by the first heat conduction plate that is configured to mirror the partially cylindrical shape of the first pipe channel, the pipe having a second section being disposed in the portion defined by the second heat conduction plate that is configured to mirror the partially cylindrical shape of the second pipe channel, the pipe forming a U-shaped elbow forming an arc bending in a constant radius to continuously connect the first and second sections of the pipe between the first heat conduction plate and the second heat conduction plate, wherein the first section of the pipe, the second section of the pipe, and the U-shaped elbow are formed from a single pipe;

wherein the cooling module comprises an adhesive layer disposed in a configuration that fastens the cooling module to the photovoltaic module; and wherein the heat insulation mat with the pipe enclosed therein is constructed in such manner that the cooling module fits completely underneath the photovoltaic module when the first and second heat conduction plates are facing towards the underside of the photovoltaic module.

2. The cooling module of claim 1, wherein the photovoltaic module is a photovoltaic module that is mounted at an installation location.

3. The cooling module according to claim 1, wherein the upper surface of the heat insulation mat is configured so that the cooling module is fastenable flat against the photovoltaic module with the aid of a fastening device to ensure good heat conductivity.

4. The cooling module according to claim 1, wherein a cover plate covers the upper surface of the heat insulation mat with the pipe enclosed therein.

5. The cooling module according to claim 1, wherein the heat insulation mat with the pipe inserted therein includes a cutaway in the area of the electrical connecting device, which is attached to the underside of the photovoltaic module.

6. The cooling module according to claim 1, wherein the heat insulation mat is made from polystyrene or polyurethane.

7. The cooling module according to claim 1, further comprising a cover plate having dimensions of the upper surface of the heat insulation mat, which cover plate is arranged on the first and second heat conduction plates and covers the pipe in the first pipe channel and the second pipe channel.

8. The cooling module according to claim 7, wherein a heat conducting paste is provided between the first and second heat conduction plates and the pipe and/or between the profiled heat conduction plates and the cover plate to facilitate heat transfer.

9. The cooling module according to claim 1, wherein the pipe comprises at least one connection point for connecting the pipe to a pipe of the same size and type.

10. The cooling module according to claim 1, further comprising a fastening device configured for connecting the cooling module to the photovoltaic module, wherein the fastening device comprises two convex plates that overlap each other and fastening means for clamping the cooling module between the convex plates and the photovoltaic module, wherein the fastening means is selected from the following group: rivets, screws and clamps and disposed where the two convex plates overlap each other.

11. A cooling module for increasing the efficiency of any standard, commercially available photovoltaic module with an underside and an electrical connecting device, the cooling module comprising:

a heat insulation mat having an upper surface and an interior disposed beneath the upper surface, the heat insulation mat defining a first pipe channel within the interior and elongating in a first direction, the heat insulation mat defining a second pipe channel within the interior and elongating parallel to the first pipe channel and spaced apart from the first pipe channel in a direction normal to the first direction;

a first heat conduction plate contacting the upper surface of the heat insulation mat and contacting the first pipe channel within the heat insulation mat, the first heat conduction plate defining a portion that is configured to mirror a shape of the first pipe channel;

a second heat conduction plate contacting the upper surface of the heat insulation mat and contacting the second pipe channel within the heat insulation mat, the second heat conduction plate defining a portion that is configured to mirror a shape of the second pipe channel;

a pipe having a first section disposed in the portion defined by the first heat conduction plate, the pipe having a second section being disposed in the portion defined by the second heat conduction plate, the pipe forming a U-shaped elbow forming an arc bending in a constant radius to continuously connect the first and second sections of the pipe between the first heat conduction plate and the second heat conduction plate, wherein the first section of the pipe, the second section of the pipe, and the U-shaped elbow are formed from a single pipe; and a fastening device comprising two convex plates that overlap each other and a fastening mechanism for coupling the two convex plates together and clamping the cooling module between the convex plates and the photovoltaic module.

12. The cooling module of claim 11, wherein the cooling module comprises an adhesive layer disposed in a configuration that fastens the cooling module to the photovoltaic module.

13. The cooling module of claim 11, wherein the heat insulation mat with the pipe enclosed therein is constructed in such manner that the cooling module fits completely underneath the photovoltaic module when the first and second heat conduction plates are facing towards the underside of the photovoltaic module.

14. A system for increasing the efficiency of any standard, commercially available photovoltaic module, the system comprising:

a photovoltaic module having an underside and an electrical connecting device; and a cooling module including:

a heat insulation mat having an upper surface and an interior disposed beneath the upper surface, the heat insulation mat defining a first pipe channel within the interior and elongating in a first direction, the heat insulation mat defining a second pipe channel within the interior and elongating parallel to the first pipe channel and spaced apart from the first pipe channel in a direction normal to the first direction, each of the first pipe channel and the second pipe channel defining a partially cylindrical shape accessible through the upper surface of the heat insulation mat via a gap aligned with the respective pipe channel;

a first heat conduction plate contacting the upper surface of the heat insulation mat and contacting the first pipe channel within the heat insulation mat, the first heat conduction plate defining a portion that is configured to mirror the partially cylindrical shape of the first pipe channel, the first heat conduction plate defining a slot accessible from the upper surface of the heat insulation mat and aligned parallel with the gap that renders the first pipe channel accessible from the upper surface of the heat insulation mat;

a second heat conduction plate contacting the upper surface of the heat insulation mat and contacting the second pipe channel within the heat insulation mat, the second heat conduction plate defining a portion that is configured to mirror the partially cylindrical shape of the second pipe channel, the second heat conduction plate defining a slot accessible from the upper surface of the heat insulation mat and aligned parallel with the gap that renders the second pipe channel accessible from the upper surface of the heat insulation mat; wherein the first heat conduction plate and the second heat conduction plate are separate from each other and define a space therebetween; and a pipe having a first section disposed in the portion defined by the first heat conduction plate that is configured to mirror the partially cylindrical shape of the first pipe channel, the pipe having a second section being disposed in the portion defined by the second heat conduction plate that is configured to mirror the partially cylindrical shape of the second pipe channel, the pipe forming a U-shaped elbow forming an arc bending in a constant radius to continuously connect the first and second sections of the pipe between the first heat conduction plate and the second heat conduction plate, wherein the first section of the pipe, the second section of the pipe, and the U-shaped elbow are formed from a single pipe;

wherein the cooling module comprises an adhesive layer disposed in a configuration that fastens the cooling module to the photovoltaic module; and wherein the heat insulation mat with the pipe enclosed therein is constructed in such manner that the cooling module fits completely underneath the photovoltaic module with the first and second heat conduction plates are facing towards the underside of the photovoltaic module.

* * * * *